(12) United States Patent
Pandey et al.

(10) Patent No.: US 8,255,653 B2
(45) Date of Patent: *Aug. 28, 2012

(54) SYSTEM AND METHOD FOR ADDING A STORAGE DEVICE TO A CLUSTER AS A SHARED RESOURCE

(75) Inventors: Manu Pandey, San Jose, CA (US); Niraj Jaiswal, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/316,054

(22) Filed: Dec. 9, 2011

(65) Prior Publication Data

US 2012/0084626 A1 Apr. 5, 2012

Related U.S. Application Data

(63) Continuation of application No. 12/141,620, filed on Jun. 18, 2008, now Pat. No. 8,095,753.

(51) Int. Cl.
G06F 12/16 (2006.01)
(52) U.S. Cl. .................. 711/162; 711/112; 711/114
(58) Field of Classification Search .................. None
See application file for complete search history.

(56) References Cited

U.S. PATENT DOCUMENTS

| 6,546,474 | B1 | 4/2003 | Weigelt |
| 6,557,089 | B1 | 4/2003 | Reed et al. |
| 6,633,962 | B1 | 10/2003 | Burton et al. |
| 6,701,332 | B1 | 3/2004 | Vella |
| 6,826,666 | B2 | 11/2004 | Berkowitz et al. |
| 7,039,828 | B1 | 5/2006 | Scott |
| 7,051,050 | B2 | 5/2006 | Chen et al. |
| 7,360,030 | B1 | 4/2008 | Georgiev |
| 7,739,541 | B1 | 6/2010 | Rao et al. |
| 7,953,890 | B1 | 5/2011 | Katkar et al. |
| 2004/0205391 | A1 | 10/2004 | Thompson |
| 2004/0221149 | A1 | 11/2004 | Rao et al. |
| 2005/0166090 | A1 | 7/2005 | Gold |
| 2007/0073828 | A1 | 3/2007 | Rao et al. |
| 2007/0276833 | A1 | 11/2007 | Sen et al. |
| 2007/0288693 | A1 | 12/2007 | Rajan et al. |
| 2008/0052455 | A1 | 2/2008 | Ahmadian et al. |
| 2008/0222373 | A1 | 9/2008 | Garimella |
| 2008/0244028 | A1 | 10/2008 | Le et al. |
| 2008/0288554 | A1 | 11/2008 | Wilding et al. |
| 2008/0301147 | A1 | 12/2008 | Yellapragada |

OTHER PUBLICATIONS

How to add a Drive to a 2003 cluster, by Robert Teraedis, from www.ehow.com, Aug. 29, 2011, 4 pages.
How to use SAN snapshots to migrate data on the same server, downloaded from NetworkadminKB.com Jul. 2007, 1 page.

(Continued)

*Primary Examiner* — Kaushikkumar Patel
(74) *Attorney, Agent, or Firm* — Brinks Hofer Gilson & Lione

(57) ABSTRACT

A system and method are described for adding a disk to a cluster as a shared resource. In one embodiment, a request is received to add a disk to a cluster as a shared disk resource. The disk may share a disk identifier with a second disk currently connected to the cluster as a shared resource. A determination is made as to which partition format is used by the disk. A unique disk identifier is retrieved and written to the disk in accordance with the determined partition format. The disk is then connected to the node as a shared disk resource. The disk may be a snapshot, mirror, or backup of the second disk currently connected to the cluster.

26 Claims, 8 Drawing Sheets

OTHER PUBLICATIONS

"HP Integrity Servers with Microsoft.RTM. Windows Server.TM. 2003 Cluster Installation and Configuration Guide", *Hewlett-Packard Development Company, L.P.*, 33 pages, HP Part Part No. 5992-4441, Published: Apr. 2008, Copyright 2008 Hewlett-Packard Development Company, L.P.

"Cyclic redundancy check", *Wikipedia, the free encyclopedia*, 6 pages, http://en.wikipedia.orglwiki/CRC32 , last modified Mar. 3, 2008, last visited May 13, 2008.

"Disk Partitioning", *Wikipedia, the free encyclopedia*, 4 pages, http://en.wikipedia.org/wiki/Disk_partitioning , last modified Apr. 30, 2008, last visited May 13, 2008.

"Extensible Firmware Interface Specification", *Intel*, 1084 pages, Version 1.10b1, Dec. 1, 2002, Copyright .COPYRGT. 1998-2002 Intel Corporation.

"Storage Networking 101: Configuring Disk Arrays", 4 pages, C. Schluting, Sep. 2007, http://www.enterprisenetworkingplanet.com/netsp/print.php/3698291 , Jupitermedia Corporate Info, Copyright 2008 Jupitermedia Corporation, last visited Jun. 4, 2008.

"Failover Cluster Step-by-Step Guide: Configuring a Two-Node Print Server Failover Cluster", *Microsoft TechNet*, 10 pages, http://technet2.rnicrosoft.com/windowserver2008/en/library/71b0e978-d1ff-4-_7a2-b4bd-1f4 ..., © 2008 Microsoft Corporation, Last visted Jun. 4, 2008.

"FC SAN", 1 page, http://www.netapp.qassociates.co.uk/images/products/gfiler/gfiler_1_map.gif, last visited Jun. 3, 2008.

"Globally Unique Identifier", *Wikipedia, the free encyclopedia*, 4 pages, http://en.wikipedia.org/wiki/Globally.sub.—Unique.sub.—Identifier, last modified May 13, 2008, last visited May 13, 2008.

"GPT disks in a Windows Server 2003 server cluster are not migrated to a Windows Serve . . . , Help and Support", 2 pages, http://support.microsoft.com/kb/947711 , © 2008 Microsoft, last visited Jun. 4, 2008.

Windows and GPT FAQ: Version 1.1, Windows, 8 pages, http://www.microsoft.com/whdc/device/storage/GPT_FAQ.mspx?pf=true , © 2008 Microsoft Corporation, last visited May 30, 2008.

"GUID Partition Table", *Microsoft TechNet*, 2 pages, http//technet2.microsoft.com/windowsserver/en/library/f9172c16-0114-49dc-_-bc92-608ff17 ..., © 2008 Microsoft Corporation, last visited Jun. 4, 2008.

"GUID Partition Table", *Wikipedia, the free encyclopedia*, 4 pages, http://en.wikipedia.org/wiki/GUID_Partition_Table, last modified Apr. 27, 2008, last visited May 13, 2008.

"How Basic Disks and Volumes Work", *Microsoft TechNet*, 25 pages, http://technet2microsoft.com/windowsserver/en/library/bdeda920-1f08-4683-9ffb-7b4b50d ..., © 2008 Microsoft Corporation, last visited Jun. 4, 2008.

IBM TotalStorage Productivity Center, Installation and Configuration Guide, Version 3, Release 1,*IBM*, 278 pages, GC32-1774-00, First Edition (Feb. 2006), © Copyright International Business Machines Corporation 2001, 2006.

Jose Barreto's Blog: Configuring the Microsoft iSCSI Software Target, 16 pages, http://blogs.technet.com/josebda/archive/2007/12/18/configuring-the-microsoft-iscsi-sofwa ..., © 2008 Microsoft Corporation, last visited Jun. 4, 2008.

"Logical Unit Number", *Wikipedia, the free encyclopedia*, 1 page, http://en.wikipedia.org/wiki/Logical_Unit_Number , last modified Apr. 9, 2008, last visited May 13, 2008.

"Antimail: How you can uniquely identify a LUN in a Storage Area Network", 10 pages, http://blog.msdn.com/adioltean/pages/344588.aspx , © 2008 Microsoft Corporation, last visited Jun .4, 2008.

"Overview of Storage Manager for SANs", *Microsoft TechNet*, 3 pages, http://technet2.microsoft.com/windowsserver/en/library/375fa791-0794-4566-b9ea-e117e15 ..., © 2008 Microsoft Corporation, last visited Jun. 2, 2008.

"Microsoft Cluster Server", *Wikipedia, the free encyclopedia*, 2 pages, http://en.wikipedia.org/wiki/Microsoft_Cluster_Server, last modified Feb. 11, 2008, last visited May 13, 2008.

"Enterprise Storage Solutions, Unique Benefits and Competitive Advantages of Netapp Snapshot.TM. Technology", *NetApp, Network Appliance, Inc.*, 6 pages, © 2003 Network Appliance, Inc.

"Connecting to San Snapshot™ Copies on HP-UX™, Description of Connecting Network Appliance Shapshot™ Copies to an HP-UX System in a SAN Environment", *NetApp, Network Appliance Inc.*, R. Jooss, Network Appliance, Inc., 12 pages, May 2004, TR-3318, © 2004 Network Appliance, Inc.

"Redbooks Paper, N series Snapshot: A Technical Discussion", *IBM*, ibm.com/redbooks, 24 pages, A. Osuna et al., Copyright IBM Corp. 2007.

"Redpaper, Using IBM System Storage N series SnapDrive for Lotus Domino for Windows", *IBM*, ibm.com/redbooks, 30 pages, A. Osuna et al., Copyright IBM Corp. 2007.

"Redbooks—Introduction to Storage Area Networks", *IBM*, ibm.com/redbooks, 352 pages, J. Tate et al., International Technical Support Organization, Fourth Edition (Jul. 2006), © Copyright International Business Machines Corporation 1999, 2003, 2006.

"SnapDrive™ for Windows or UNIX: Extending NeApp Simplicity to SANs", *NetApp*, 1 page, © Network Appliance 2004.

"SnapDrive for Windows", *NetApp*, 1 page, http://www.printthis.clickability.com/pt/cpt?action=cpt&title=NetApp+-+Products++Man ..., last visited May 13, 2008.

"Snapshot (computer storage)", *Wikipedia, the free encyclopedia*, 2 pages, http://en.wikipedia.org/wiki/Snapshot_(computer storage), last modified Apr. 21, 2008, last visited May 13, 2008.

"Storage area network", *Wikipedia, the free encyclopedia*, 4 pages, http://en.wikipedia.org/w/index.php?title=Storage_area_network& printable=yes , last modified Jun. 2, 2008, last visited Jun. 2, 2008, last visited Jun. 4, 2008.

Storage Networking 101: Configuring SAN-Attached Servers, 4 pages, C. Shluting, Sep. 19, 2007, http://www.enterprisenetworkingplanet.com/netsp/print.php/3700521 , Jupitermedia Corporate Info, Copyright 2008 Jupitermedia Corporation, last visited Jun. 4, 2008.

"Network Appliance—Technical Overview of SnapDrive", *NetApp*, 6 pages, http://www.netapp.com/tech_library_3197.html?fmt=print , last visited Sep. 15, 2004.

"Disk mirroring", *Wikipedia, the free encyclopedia*, 2 pages, http://en.wikipedia,org/w/index.php?title=Disk_mirroring& printable=yes , last modified Mar. 25, 2008, last visited Jun. 4, 2008.

"Technical Overview of NetApp SnapDrive", *NetApp, Network Appliance Inc.*, 12 pages, Apr. 2007, TR-3197, © 2007 Network Appliance, Inc.

"Oracle9i™ for Windows.RTM. 2000 Advanced Server: Building Availability Clusters with a NetApp.RTM. Filer in a SAN Environment", *NetworkAppliance*, 18 pages, T. Creek, Network Appliance, Inc., Apr. 2003, TR-3245, © 2003 Network Appliance, Inc.

"Microsoft® Cluster Services and Network Appliance™ Storage Devices: Integration of Storage", *NetApp, Network Appliance Inc.*, 10 pages, © 2005 Network Appliance, Inc.

"DB2 9 for Windows: Integrating with a NetApp or IBM N Series Storage System", *NetApp*, 29 pages, J. Lal , et al., Network Appliance, Inc., Aug. 1, 2006, TR-3489, www.netapp.com, © 2006 Network Appliance, Inc.

"Understanding and exploiting snapshot technology for data protection Part 1: Snapshot technology overview", *IBM*, 6 pages, N. Garimella, http://www-128.ibm.com/developerworks/tivoli/library/t-snaptsm1/index.html , last visited Jun. 4, 2008.

http://www.arumtec.net/virtualisation/assets/images/Schema-NetApp-v-series.qif, 1 page, last visited Jun. 3, 2008.

"VERITAS Cluster Server™ Storage Agent for NetworkAppliance", NetworkApplicance, 2 pages, Copyright © 2001 VERITAS.

"Adding Disk to Cluster", 11 pages, Mar. 19, 2008, http://blogs.msdn.com/clustering/archive/2008/03/19/8324538.aspx, last visited Jun. 4, 2008.

"Microsoft Windows Server 2003—Server Clusters: Storage Area Networks", *Microsoft Corporation*, 39 pages, Mar. 2003.

"Windows Server High Availability With Windows Server Longhorn Failover Clustering," 39 pages, E. Christensen, Microsoft WinHEC 2006.

"IBM System Storage N. series, Data ONTAP 7.2 Block Access Management for iSCSI and FCP Guide," 328 pages, GC26-7973-02, NA 210-03733_A0, Updated for Data ONTAJP 7.2.3, May 2007.

"IBM System Storage N. series, Data ONTAP 7.2 Storage Management Guide," 254 pages, GC26-7966-04, NA 210-03897_A0, Updated for Data ONTAP 7.2.4L1, May 2007.

SYSTEM AND METHOD FOR ADDING A STORAGE DEVICE TO A CLUSTER AS A SHARED RESOURCE

CROSS-REFERENCE TO RELATED APPLICATION

This application is a continuation of U.S. patent application Ser. No. 12/141,620, filed Jun. 18, 2008 now U.S. Pat. No. 8,095,753, which is hereby incorporated by reference.

BACKGROUND

A cluster is a group of individual servers, or nodes, configured to appear as a single, virtual server, to both users and applications. The nodes are physically connected by cables and programmatically connected by clustering software, such as Microsoft's Cluster Server™ and Microsoft's Failover Cluster™. The clustering software may run on each node and manage all cluster-specific activity. The cluster nodes may be attached to one or more shared disks by a shared bus. The clustering software differentiates between the shared disks by using a disk identifier stored on the disks themselves.

If a cluster node attempts to connect to a disk having the same disk identifier as a shared disk currently connected to another node in the cluster, such as a backup or snapshot of an existing disk on the cluster, the clustering software will be unable to differentiate between the two disks, rendering the new disk inaccessible. Thus, there may be a need for enabling a disk to be added to a cluster as a shared resource when the disk has the same disk identifier as an existing shared disk resource on the cluster.

DETAILED DESCRIPTION

Figure 1:
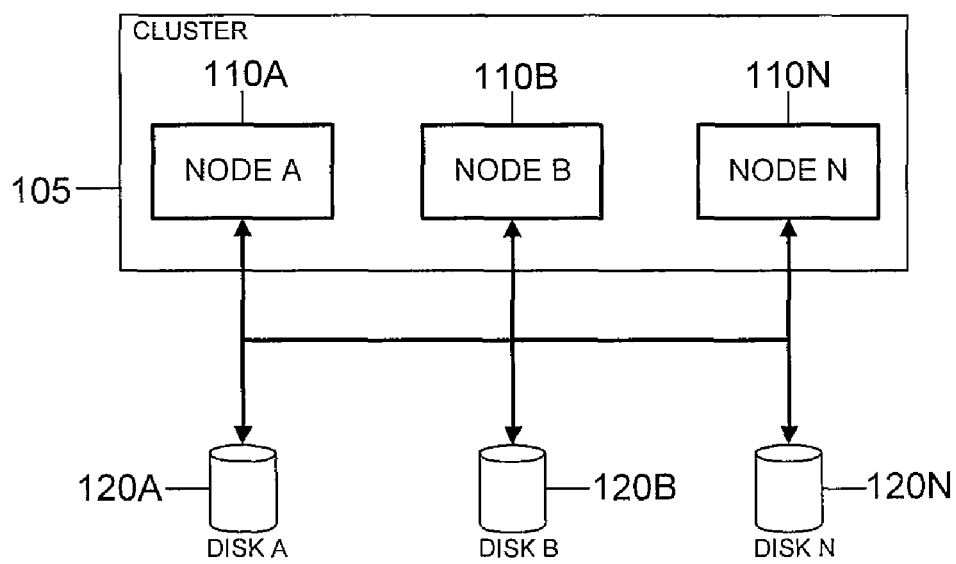
FIG. 1 is a block diagram of a general overview of a system of an embodiment for adding a disk to a cluster as a shared disk resource.

In these embodiments, a system is presented for adding a disk to a cluster node as a shared disk resource irrespective of the unique identifier or partition type of the disk, which provides an advantage over the prior systems by allowing a disk to be added to a cluster as a shared disk resource regardless of whether the disk shares a disk identifier with an existing shared disk resource on the cluster. Allowing a disk to be added to a cluster as a shared disk resource, irrespective of the unique identifier or partition type of the disk, enables adding copies of shared disks to the same cluster which hosts the shared disks the copies originate from. Examples of copies of shared disks may include snapshot disks, mirror disks, and backup disks. Snapshot, mirror, and backup disks provide access to copies of files, directories or entire disks at a particular moment in time. Allowing snapshot, mirror and backup disks to be connected to a node on a cluster where the cluster also contains the original disks may greatly reduce the costs associated with data integrity, regulatory compliance, and testing operations on the cluster. For example, these operations can be performed without the need for a separate host to perform them.

The system in these embodiments enables adding any disk to a cluster as a shared disk resource without generating conflicts with existing shared disks on the cluster. When a request to add a disk to a cluster node is received, a determination is made as to which partition format is utilized by the disk. A unique identifier is retrieved from the clustering software and written to the disk in accordance with the partition format. The disk can then be connected to the cluster node as a shared disk resource.

The partition format of the disk can be any self-identifying or non-self identifying format, such as the globally unique partition table (GPT) partition format or the master boot record (MBR) partition format. The disk added to the cluster can be a snapshot, backup, or mirror disk. The disk may be a snapshot, backup or mirror disk of an existing shared disk resource on the cluster. The disk to be added also may have the same disk identifier as a shared disk resource on the cluster.

Since the system writes a new disk identifier to the disk, there will be no conflicts with existing shared disk resources on the cluster. Furthermore, since the disk identifier was written in accordance with the partition format of the disk, there is no risk of corrupting the disk or otherwise rendering the disk inaccessible.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

Turning now to the drawings, FIG. 1 provides a general overview of a system 100 of an embodiment for adding a disk to a cluster as a shared disk resource. Not all of the depicted components may be required, however, and some implementations may include additional components. Variations in the arrangement and type of the components may be made without departing from the spirit or scope of the claims as set forth herein. Additional, different or fewer components may be provided.

In this embodiment, system 100 includes a cluster 105, containing cluster nodes 110A-N, also referred to as nodes, connected to disks 120A-N. Disks 120A-N may be logical storage volumes, such as the logical unit numbers (LUNs) 220A-N in FIG. 2 below. Nodes 110A-N may be programmatically connected using clustering software, such as Microsoft's Cluster Server™ and Microsoft's Failover Cluster™ The functionality provided by the system 100 may be integrated into the clustering software or may be provided by a third party software application, such as NetApp's Snap-Drive™.

Any of nodes 110A-N may access any of disks 120A-N, however, the clustering software may only allow one of nodes 110A-N to access a particular disk at a time. Disks 120A-N may utilize a partition format to organize the data stored on the disks 120A-N. In one embodiment, the partition format may be a self-identifying partition format, such as the GPT format, or a non-self identifying partition format, such as an MBR format. Each of the disks 120A-N may store a disk identifier. The disk identifier is used by the clustering software to differentiate between the disks 120A-N connected to the nodes 110A-N on the cluster 105. The disk identifier may also be used by the underlying operating system or third party applications to identify the disks 120A-N. Each of the partition formats may use separate protocols for writing the disk identifier on the disks 120A-N. For example, self-identifying partitions may write a backup of the disk identifier to the disk, while the non-self identifying partitions may not. Thus, when writing the disk identifier to a disk utilizing a self-identifying partition, two separate values may need to be written, whereas setting the disk on a disk utilizing a non-self identifying partition may only require writing one value.

In one operation, disk B 120B may be a copy of disk A 120A, such as a snapshot, mirror, or backup of disk A 120A. Since disk A 120A and B 120B are copies, disk A 120A and B 120B share the same disk identifier. Node A 110A may be connected to disk A 120A when the system 100 receives a request from the node B 110B to connect to disk B 120B. The system 100 retrieves a unique identifier from the underlying operating system, such as Microsoft Windows Server 2003™ or Microsoft Windows Server 2008™, via an application programming interface (API). The system 100 determines the partition format utilized by disk B 120B, such as a self-identifying partition or a non-self identifying partition. The system 100 sets the disk identifier of disk B 120B to the retrieved unique identifier, in accordance with the disk identifier write protocol associated with the partitioning format utilized by disk B 120B. The system 100 achieves increased efficiency by writing the disk identifier of disk B 120B irrespective of whether the unique identifier was previously written. Thus, regardless of whether this is first time disk B 120B is connected to the cluster 105, or whether disk B 120B has been previously connected to the cluster 105, the system 100 sets the disk identifier of disk B 120B to the retrieved unique identifier. The system 100 then connects disk B 120B to the node B 120B. Since the system 100 has updated the disk identifier of disk B 120B, disk B 120B no longer contains the same disk identifier as disk A 120A. Thus, the clustering software will recognize disk B 120B as a new disk, not as disk A 120A.

Figure 2:
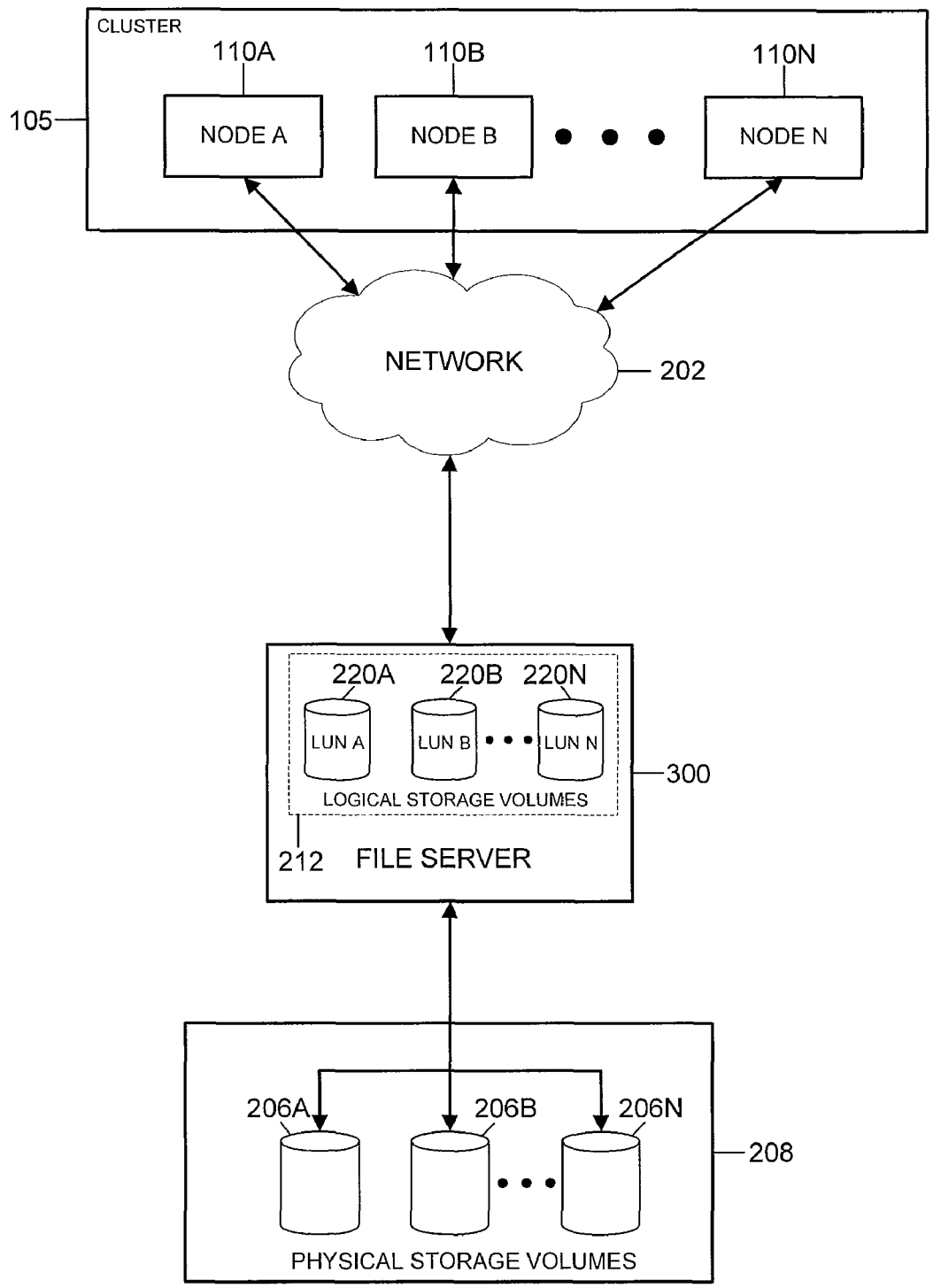
FIG. 2 is a block diagram of an exemplary network environment of an embodiment.

FIG. 2 is a block diagram of an exemplary network environment 200 of an embodiment. Network 202 can be a local area network (LAN), a wide area network (WAN), virtual private network (VPN) utilizing communication links over the internet, for example, or a combination of LAN, WAN, and VPN implementations. For the purposes of this description, the term network should be taken broadly to include any acceptable network architecture. The network 202 interconnects the cluster nodes 110A-N. Also attached to the network 202 is a file server 300. The file server 300, which is described in more detail in FIG. 3 below, is configured to control storage of, and access to, data and a set 208 of interconnected physical storage volumes 206. The file server 300 and the storage volumes 206 may be connected to a common communication and data transfer infrastructure, such as Fibre Channel, and may collectively comprise a storage area network (SAN). The file server 300 may present one or more logical storage volumes 212, such as the LUNs 220A-N, to the cluster nodes 110A-N. Each of the LUNs 220A-N may be a collection of, or a part of, physical or virtual disks configured as a single disk. In FIG. 2, LUNs 220A-N may be a logical representation of one or more of the physical storage volumes 212. File server 300 may provide the LUNs 220A-N to cluster nodes 110A-N such that LUNs 220A-N appear to the cluster nodes 110A-N as locally attached storage devices. For example, LUNs 220A-N may appear to cluster nodes 110A-N as locally attached MBR partitioned disks or locally attached GPT partitioned disks, which can be formatted and managed to store data.

The cluster 105 may include a cluster database which stores the configuration information for the cluster nodes 110A-N. The configuration information may include which nodes 110A-N are part of the cluster 105, what resources are installed in the cluster 105, and what state those resources are in, such as offline, offline pending, online, online pending, or failed. The cluster database may be part of a quorum resource, which is typically a shared disk resource connected to the cluster 105. The cluster database may identify the LUNs 220A-N in the cluster database by their disk identifiers. The disk identifier of a GPT disk may be the disk globally unique identifier (GUID) and the disk identifier of an MBR disk may be the disk signature. The disk identifiers of GPT and MBR disks are discussed in more detail in FIG. 4 below.

Each of the devices attached to the network 202 includes an appropriate conventional network interface arrangement (not shown) for communicating over the network using desired communication protocols such as the well-known Transport Control Protocol/Internet Protocol (TCP/IP), User Datagram Protocol (UDP), Hyper Text Transport Protocol (HTTP), Simple Network Management Protocol (SNMP), or Virtual Interface Connections (VI).

In operation, the cluster 105 may utilize snapshot technology to perform data protection and other tasks such as data mining and data cloning on one or more of the LUNs 220A-N. The snapshot technology may be provided on a cluster node A 110A by NetApp's SnapDrive™, or on the file server 300 by NetApp's Data ONTAP™ file operating system. The snapshot technology may be capable of creating a point-in-time image of data, referred to as a snapshot of the data. The data may include files, directories and/or entire LUNs. A snapshot of an entire LUN will have the same disk identifier as the original LUN.

For example, the LUN A 220A may be connected to the node A 110A. The node A 110A may use NetApp's SnapDrive™ to create a snapshot of the LUN A 220A. The snapshot of the LUN A 220A may be used to create a snapshot LUN B 220B. Since the snapshot LUN B 220B is a copy of original LUN A 220A, the snapshot LUN 220B and the original LUN 220A share the same disk identifier. If the node B 110B requests to connect to the LUN B 220B, the system 100 will determine the partition format of the LUN B 220B, such as GPT or MBR. The system 100 retrieves a new disk identifier, such as a globally unique identifier, from the underlying operating system by calling an API. The system 100 sets the disk identifier of the LUN B 220B to the new disk identifier in accordance with the disk identifier write protocol associated with the partition type used by the LUN B 220B. Disk identifier storage and write protocols for GPT and MBR disks may be discussed in more detail in FIG. 4 below. The system 100 then connects the snapshot LUN B 220B to the node B 110B.

The cluster 105 may also utilize mirroring technology for data protection and disaster recovery. The mirroring technology may be provided by NetApp's SnapMirror™ software running on the file server 300. The mirroring technology may maintain a "mirror" or second copy of a data source, such as one of the storage volumes 206A-N. A mirror LUN may be one or more of the LUNs 220A-N connected to the cluster 105 as shared disk resources. A mirrored LUN will share the same disk identifier as the original LUN it was mirrored from.

For example, the LUN A 220A may be connected to the node A 110A. The node A 110A may use NetApp's Snap-Drive™ to create a mirror LUN B 220B of the LUN A 220A. Since the mirror LUN B 220B is a copy of original LUN A 220A, the mirror LUN B 220B and the original LUN A 220A share the same disk identifier. If the node B 110B requests to connect to the LUN B 220B, the system 100 will determine the partition type of the LUN B 220B, such as GPT or MBR. The system 100 will retrieve a new disk identifier, such as a globally unique identifier, from the underlying operating system by calling an API. The system 100 sets the disk identifier of the LUN B 220B to the new disk identifier in accordance with the disk identifier write protocol associated with the partition type used by the LUN B 220B. Disk identifier storage and write protocols for GPT and MBR disks may be discussed in more detail in FIG. 4 below. The system 100 then connects the mirror LUN B 220B to the node B 110B.

Lastly, the cluster 105 may utilize backup technology for storing data backups, such as to comply with regulations that require backup data copies that cannot be deleted or modified. The backup technology may be provided by NetApp's SnapVault™. The backup technology may create backups of files, directories and/or entire LUNs 220A-N. The backup may include one or more of the LUNs 220A-N connected to the cluster 105 as shared disk resources. A backup LUN will share the same disk identifier as the original LUN it was backed up from.

For example, the LUN A 220A may be connected to the node A 110A. The node A 110A may use NetApp's Snap-Drive™ to create a backup LUN B 220B of the LUN A 220A. Since the backup LUN B 220B is a copy of original LUN A 220A, the backup LUN B 220B and the original LUN A 220A share the same disk identifier. If the node B 110B requests to connect to the LUN B 220B, the system 100 will determine the partition type of the LUN B 220B, such as GPT or MBR. The system 100 will retrieve a new disk identifier, such as a globally unique identifier, from the underlying operating system by calling an API. The system 100 sets the disk identifier of the LUN B 220B to the new disk identifier in accordance with the disk identifier write protocol associated with the partition type used by the LUN B 220B. Disk identifier storage and write protocols for GPT and MBR disks may be discussed in more detail in FIG. 4 below. The system 100 then connects the backup LUN B 220B to the node B 110B.

Figure 3:
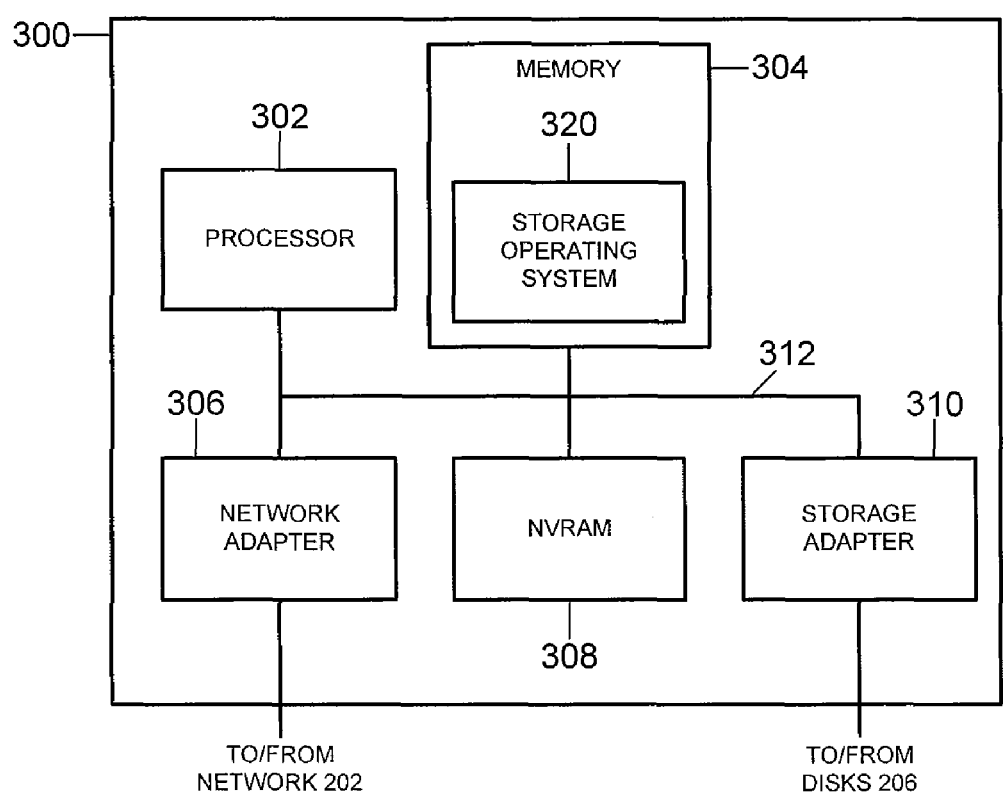
FIG. 3 is a block diagram of an exemplary file server of an embodiment.

FIG. 3 is a block diagram of an exemplary file server 300 in the network environment 200 of FIG. 2. The file server 300, or filer, is a computer that provides file service relating to the organization of information on storage devices, such as disks. The embodiments described herein can apply to any type of file server 300, whether implemented as a special-purpose or general-purpose computer, including a standalone computer. The file server 300 comprises a processor 302, a memory 304, a network adapter 306, a nonvolatile random access memory (NVRAM) 308, and a storage adapter 310 interconnected by system bus 312. Contained within the memory 304 is a storage operating system 320 that manages and provides the LUNs 220A-N to the cluster nodes 110A-N. The memory 304 includes storage locations that are addressable by the processor 302 and adapters for storing software program code. Portions of the operating system 320 are typically resident in memory and executed by the processing elements. The operating system 320 functionally organizes the file server 300 by inter alia, invoking storage operations in support of a file service implemented by the file server 300.

The network adapter 306 comprises the mechanical, electrical and signaling circuitry needed to connect the file server 300 to a cluster node A 110A over network 202. Cluster node A 110A maybe a general-purpose computer configured to execute applications, such as clustering software and third party applications. Moreover, cluster node A 110A may interact with the file server 300 in accordance with the client/server model of information delivery. That is, cluster node A 110A may request the services of the file server 300, and the file server 300 may return the results of the services requested by cluster node A 110A, by exchanging packets defined by an appropriate networking protocol.

The storage adapter 310 incorporates with the storage operating system 320 executing on the file server 300 to access information requested by cluster node A 110A. The cluster node A 110A may request data appearing on the LUNs 220A-N. The information may be physically stored on the disks 206 of the set of storage volumes 208 (FIG. 2) that is attached via the storage adapter 310 to the file server 300. The storage adapter 310 includes input/output (I/O) interface circuitry that couples to the disks 206 over an I/O interconnect arrangement, such as a conventional high-performance Fibre Channel serial link topology. The information is retrieved by the storage adapter 310 and, if necessary, processed by the processor 302 (or the adapter 310 itself) prior to be forwarded over the system bus 312 to the network adapter 306, where information is formatted into appropriate packets and returned to cluster node A 110A, as if the information resided on the LUNs 220A-N.

In one exemplary file server implementation, the file server 300 can include a non-volatile random access memory (NVRAM) 308 that provides fault-tolerant backup of data, enabling the integrity of file server transactions to survive a service interruption based upon a power failure or other fault. The storage operating system 320 may be NetApp's Data ONTAP™, residing on the file server 300, processing file-service requests from the cluster nodes 110A-N.

Figure 4:
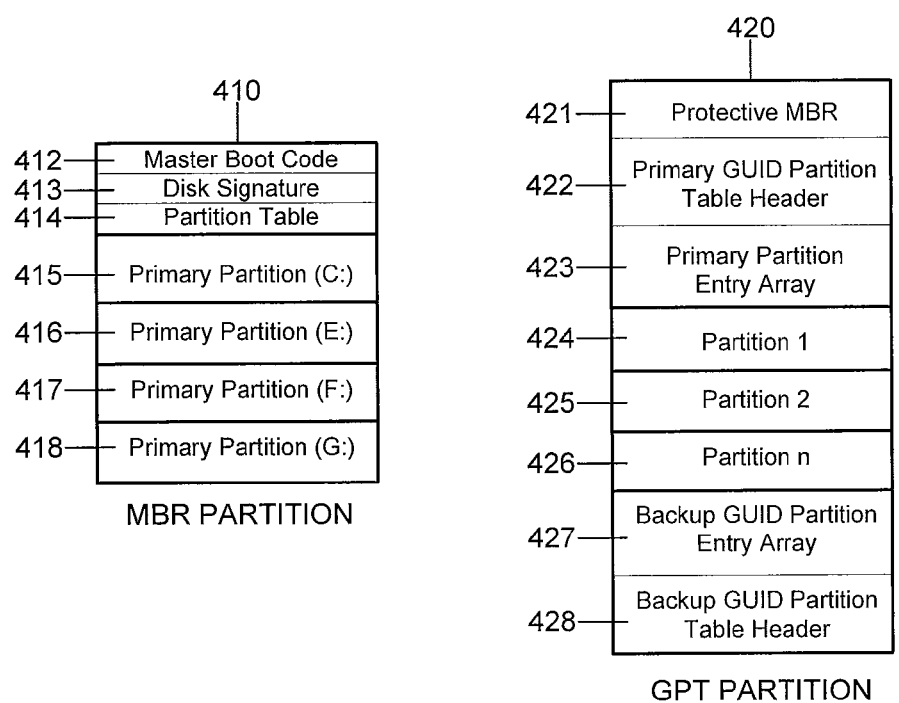
FIG. 4 is an illustration of a master boot record (MBR) partition format and a globally unique identifier partition table (GPT) partition format.

FIG. 4 is an illustration of an MBR disk partition format 410 and a GPT disk partition format 420 which may be used on LUNs 220A-N in an embodiment. The MBR disk partition format 410 may include a master boot code 412, a disk signature 413, a partition table 414, a C primary partition 415, an E primary partition 416, an F primary partition 417 and a G primary partition 418. The GPT disk partition format 420 may include a protective MBR 421, a primary GPT header 422, a primary partition entry array 423, a first partition 424, a second partition 425, an n partition 426, a backup GUID partition entry array 427 and a backup GPT header 428. The GPT disk partition format 420 may have up to 128 partitions, thus the n partition 426 may be any number from 3-128.

In the MBR disk partition format 410, the disk identifier may be stored as the disk signature 413. Thus, when setting the disk identifier of an MBR disk, only the disk signature 413 needs to be set. The MBR disk partition format 410 is not fully self-identifying; i.e., some data critical to platform operation is located in unpartitioned or "hidden" sectors.

In the GPT disk partition format 420, the disk identifier may be stored as a disk GUID, which is part of the primary GPT header 422. However, the GPT disk partition format 420 also stores a backup disk identifier as a backup disk GUID, which is part of the backup GPT header 428. Thus, changing the disk GUID in a GPT disk also requires changing a partition GUID of each partition in the GPT disk. The partition GUIDs of the partitions are stored in the partition entry array 423 and, like the disk GUID, a backup of each partition GUID is stored in the backup partition entry array 427. In addition, the GPT disk partition format 420 stores verification values for the GPT header 422 and the partition entry array 423 in the GPT header 422, and verification values for the backup GPT header 428 and the backup partition entry array 427 in the backup GPT header 428. The verification values are cyclic redundancy check values. Thus, when setting the disk identifier of a GPT disk, the disk GUID needs to be set in the GPT header 422 and the backup GPT header 428. In addition, the partition GUIDs need to be set in the primary partition entry array 423 and the backup partition entry array 427. Lastly, the verification values for the GPT header 422 and the partition entry array 423 must be calculated and set in the primary GPT header 422 and verification values for the backup GPT header 428 and the backup partition entry array 427 must be set in the backup GPT header 428. Setting the disk GUID of a GPT disk is discussed in more detail in FIG. 6 below.

The GPT disk partition format 420 is well defined and fully self-identifying; i.e., data critical to platform operation is located in partitions and not in unpartitioned or "hidden" sectors.

Figure 5:
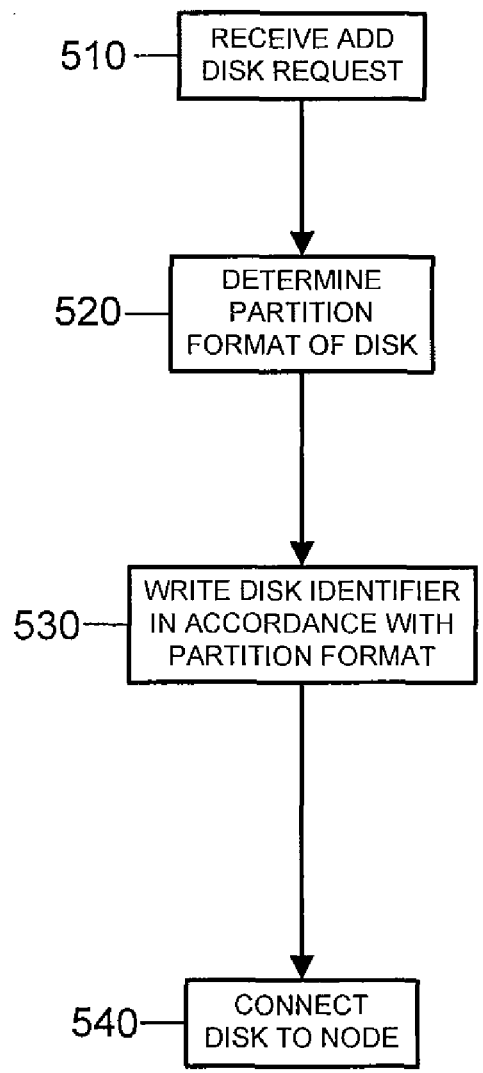
FIG. 5 is a flowchart illustrating an add-disk-operation of an embodiment.

FIG. 5 is a flowchart illustrating an overview of an add-disk operation of an embodiment. At step 510, the system 100 may receive a request from a cluster node A 110A to add a disk, such as one of the LUNs 220A-N, to the cluster 105 as a shared disk resource. At step 520, the system 100 may determine the partition format of the disk, such as a self-identifying partition or a non-self identifying partition. The partition format of the disk may be determined, or selected, from a plurality of partition formats. The plurality of partition formats may include any partition formats supported by the clustering software, or underlying operating system. At step 530, the system 100 may write a new disk identifier to the disk in accordance with the disk identifier storage procedures of the partition format used by the disk. The system 100 may achieve increased efficiency by writing a new disk identifier irrespective of whether the disk identifier had previously been written. At step 540, the system 100 may connect the disk to the cluster node A 110A as a shared disk resource.

Since the system 100 updated the disk identifier of the disk, there will be no conflicts with existing shared disk resources on the cluster 105. Furthermore, since the disk identifier was set in accordance with the protocols associated with the partition format used by the disk, there is no risk of corrupting the disk or otherwise rendering the disk inaccessible.

Figure 6:
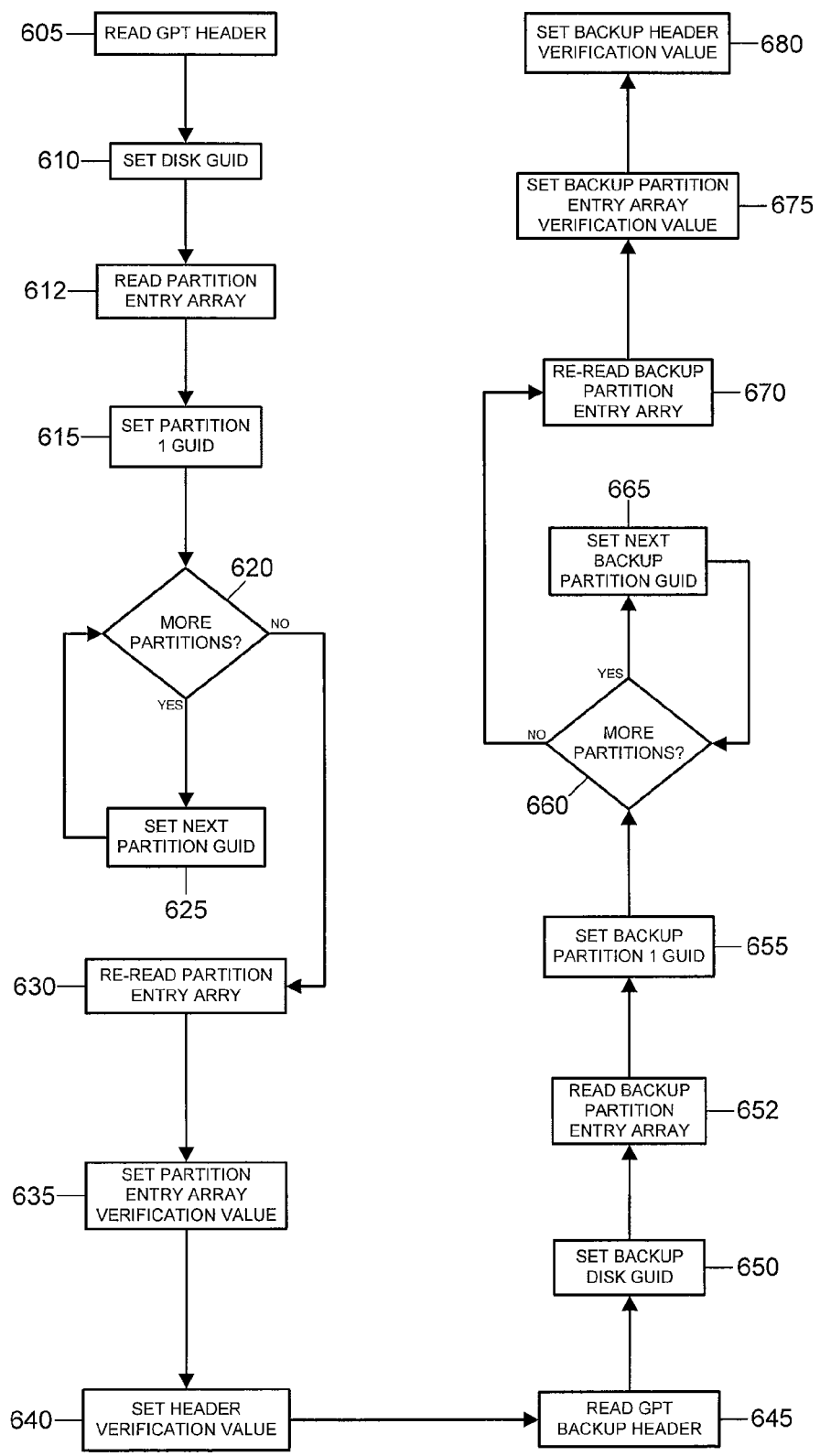
FIG. 6 is a flowchart illustrating a set-GPT-disk-identifier operation of an embodiment.

FIG. 6 is a flowchart illustrating an overview of a set-GPT-disk-identifier operation of an embodiment. At step 605, the system 100 reads the primary GPT header 422 from a disk utilizing the GPT partition format, such as the LUN A 220A. At step 610, the system 100 retrieves a new GUID from the underlying operating system by calling an API, and sets the disk GUID in the GPT header 422 to the retrieved GUID. At step 612, the system 100 reads the partition entry array 423 from the disk. At step 615, the system 100 retrieves a new GUID from the underlying operating system by calling an API, and sets the first partition GUID in the partition entry array 423 to the retrieved GUID. At step 620, the system 100 determines if there are additional partitions in the partition entry array 423. If, at step 620, there are additional partitions in the partition entry array 423, the system 100 moves to step 625 and sets the next partition GUID. The system 100 will set the partition GUID for each partition stored in the partition entry array 423.

Once all of the partition GUIDs are set in the partition entry array 423, the system 100 moves to step 630. At step 630, the system 100 re-reads the partition entry array 423 to retrieve the newly set values. At step 635, the system 100 calculates and sets the partition entry array verification value in the GPT header 422. The partition entry array verification value can be determined by calculating a cyclic redundancy check (CRC) value of the data stored in the partition entry array 423. A CRC may be a type of function that takes an input of data stream of any length and produces as output a value of a certain fixed size. The output value can then be used as a checksum to detect alteration of the data during transmission or storage. The CRC value may be a CRC-16 value, a CRC-32 value, a CRC-64 value, or generally any CRC value. At step 640, the system 100 calculates and sets the GPT header verification value in the GPT header 422. The GPT header verification value can be determined by calculating a CRC value of the data stored in the GPT header 422.

At step 645 the system 100 reads the GPT backup header 428. At step 650, the system 100 sets the backup disk GUID in the backup GPT header 428 to the GUID retrieved in step 610. At step 652, the system 100 reads the backup partition entry array 427 from the disk. At step 655, the system 100 sets the backup first partition GUID in the backup partition entry array 427 to the partition GUID retrieved in step 615 above. At step 660, the system 100 determines if there are additional partitions in the backup partition entry array 428. If, at step 660, there are additional partitions in the backup partition entry array 428, the system 100 moves to step 665 and sets the next backup partition GUID to the value retrieved in step 625 above. The system 100 will set the backup partition GUID for each partition stored in the backup partition entry array 428.

Once all of the backup partition GUIDs are set in the backup partition entry array 428, the system 100 moves to step 670. At step 670, the system 100 re-reads the backup partition entry array 428 to retrieve the newly set values. At step 675, the system 100 calculates and sets the backup partition entry array verification value in the backup GPT header 428. The backup partition entry array verification value can be determined by calculating a CRC value of the data stored in the backup partition entry array 427. At step 680, the system 100 calculates and sets the backup GPT header verification value in the backup GPT header 428. The backup GPT header verification value can be determined by calculating a CRC value of the data stored in the backup GPT header 428.

Figure 7:
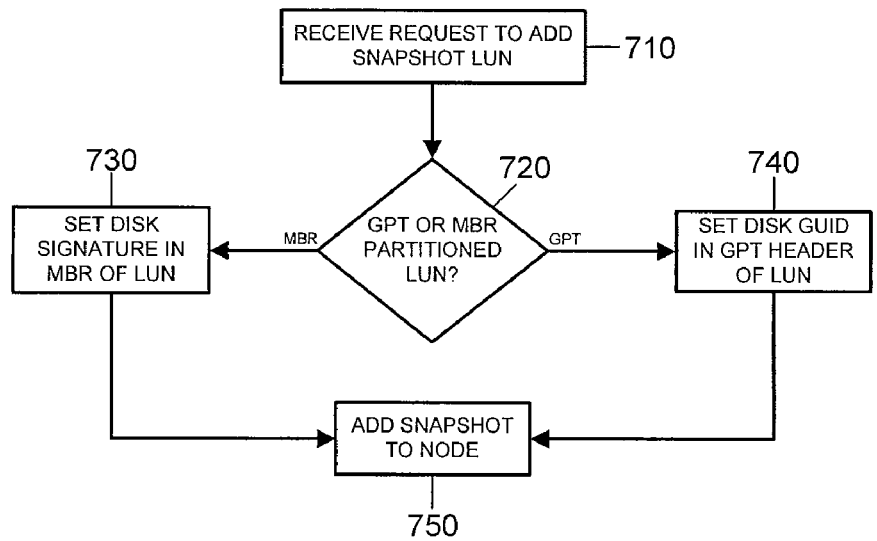
FIG. 7 is a flowchart illustrating an add-snapshot operation of an embodiment.

FIG. 7 is a flowchart illustrating the steps of an add-snapshot operation of an embodiment. At step 710, the system 100 may receive a request from the node B 110B to add the LUN B 220B as a shared disk resource. The LUN B 220B may be a snapshot LUN of the LUN A 220A. The LUN A 220A may be connected to the node A 110A as a shared disk resource. At step 720, the system 100 may determine whether the LUN B 220B utilizes the GPT partition format or the MBR partition format. If, at step 720, the system 100 determines that the LUN B 220B utilizes the MBR partition format, the system 100 moves to step 730. At step 730, the system 100 sets the disk signature of the LUN B 220B in accordance with the MBR disk identifier storage procedures identified in FIG. 4 above. If, at step 720, the system 100 determines that the LUN B 220B utilizes the GPT partition format, the system 100 moves to step 740. At step 740, the system 100 sets the disk GUID in the LUN B 220B in accordance with the GPT disk identifier storage procedures identified in FIG. 6 above. At step 750, the system 100 adds the snapshot LUN B 220B to the node B 110B as a shared disk resource.

Since the system 100 updated the disk identifier of the LUN B 220B, there will be no conflicts with the LUN A 220A on the cluster 105. Furthermore, since the disk identifier was set in accordance with the procedures associated with the partition format used by the LUN B 220B, the system 100 avoided corrupting the LUN B 220B, or otherwise rendering the LUN B 220B inaccessible.

Figure 8:
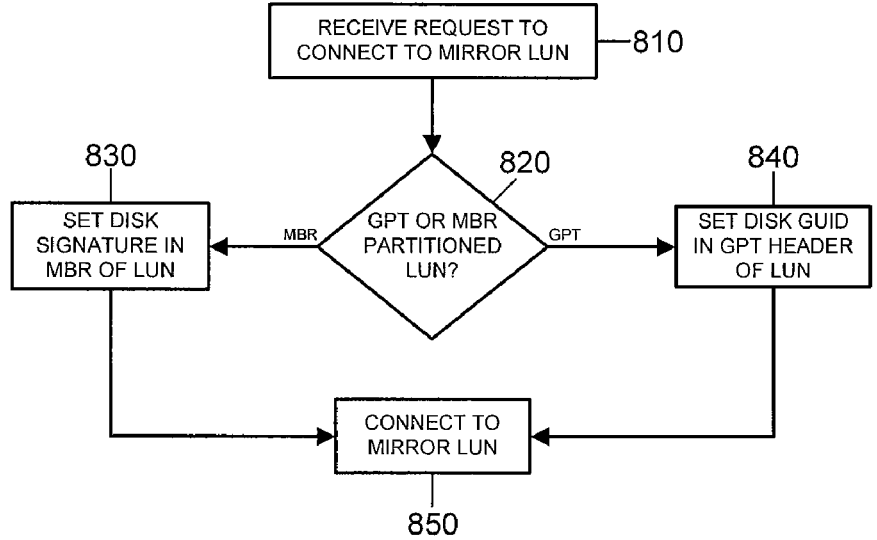
FIG. 8 is a flowchart illustrating a connect-to-mirror operation of an embodiment.

FIG. 8 is a flowchart illustrating the steps of a connect-to-minor operation of an embodiment. At step 810, the system 100 may receive a request from the node B 110B to connect to the LUN B 220B as a shared disk resource. The LUN B 220B may be a mirror LUN of the LUN A 220A. The LUN A 220A may be connected to the node A 110A as a shared disk resource. At step 820, the system 100 may determine whether the LUN B 220B utilizes the GPT partition format or the MBR partition format. If, at step 820, the system 100 determines that the LUN B 220B utilizes the MBR partition format, the system 100 moves to step 830. At step 830, the system 100 sets the disk signature of the LUN B 220B in accordance with the MBR disk identifier storage procedures identified in FIG. 4 above. If, at step 820, the system 100 determines that the LUN B 220B utilizes the GPT partition format, the system 100 moves to step 840. At step 840, the system 100 sets the disk GUID in the LUN B 220B in accordance with the GPT disk identifier storage procedures identified in FIG. 6 above. At step 850, the system 100 connects the node B 110B to the mirror LUN B 220B as a shared disk resource.

Since the system 100 updated the disk identifier of the LUN B 220B, there will be no conflicts with the LUN A 220A on the cluster 105. Furthermore, since the disk identifier was set in accordance with the procedures associated with the partition format used by the LUN B 220B, the system 100 avoided corrupting the LUN B 220B, or otherwise rendering the LUN B 220B inaccessible.

Figure 9:
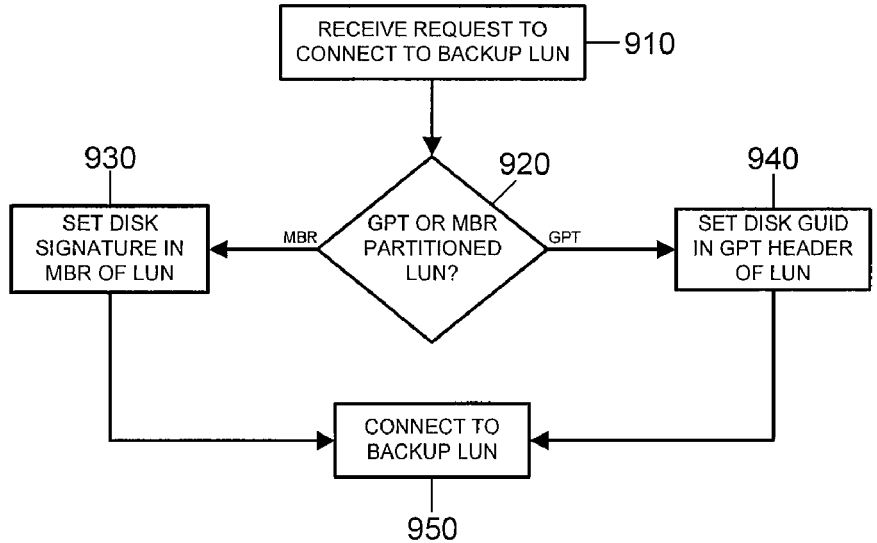
FIG. 9 is a flowchart illustrating a connect-to-backup operation of an embodiment.

FIG. 9 is a flowchart illustrating the steps of a connect-to-backup operation of an embodiment. At step 910, the system 100 may receive a request from the node B 110B to connect to the LUN B 220B as a shared disk resource. The LUN B 220B may be a backup LUN of the LUN A 220A. The LUN A 220A may be connected to the node A 110A as a shared disk resource. At step 920, the system 100 may determine whether the LUN B 220B utilizes the GPT partition format or the MBR partition format. If, at step 920, the system 100 determines that the LUN B 220B utilizes the MBR partition format, the system 100 moves to step 930. At step 930, the system 100 sets the disk signature of the LUN B 220B in accordance with the MBR disk identifier storage procedures identified in FIG. 4 above. If, at step 920, the system 100 determines that the LUN B 220B utilizes the GPT partition format, the system 100 moves to step 940. At step 940, the system 100 sets the disk GUID in the LUN B 220B in accordance with the GPT disk identifier storage procedures identified in FIG. 6 above. At step 950, the system 100 connects the node B 110B to the backup LUN B 220B as a shared disk resource.

Since the system 100 updated the disk identifier of the LUN B 220B, there will be no conflicts with the LUN A 220A on the cluster 105. Furthermore, since the disk identifier was set in accordance with the procedures associated with the partition format used by the LUN B 220B, the system 100 avoided corrupting the LUN B 220B, or otherwise rendering the LUN B 220B inaccessible.

Figure 10:
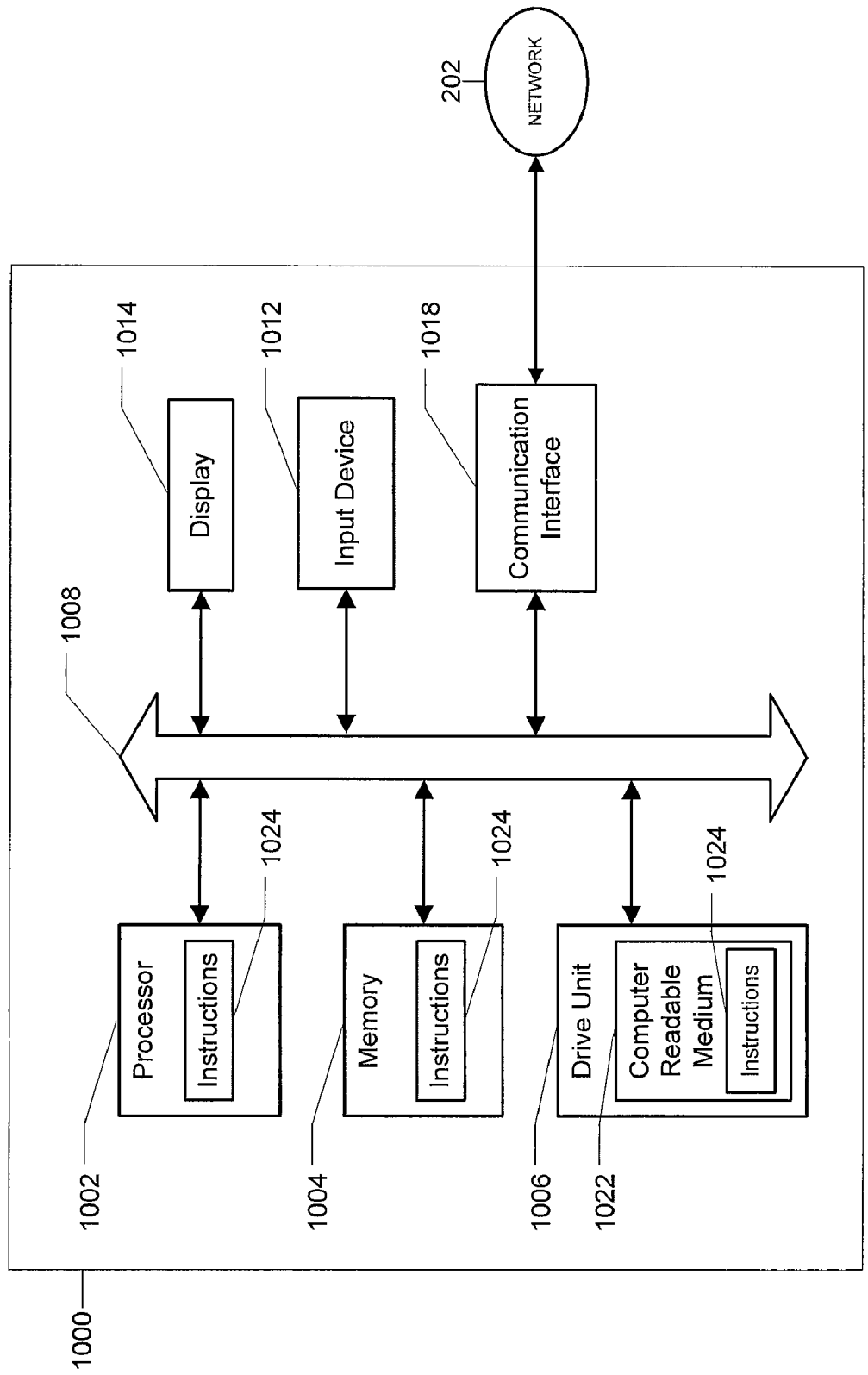
FIG. 10 is an illustration of a computer to be used as an exemplary cluster node of an embodiment.

FIG. 10 illustrates an exemplary computer system 1000 which may be used as one of the cluster nodes 110A-N in an embodiment. The computer system 1000 includes a set of instructions 1024 that may be executed to cause the computer system 1000 to perform any one or more of the methods or computer based functions disclosed herein. The computer system 1000 may operate as a standalone device or may be connected, e.g., using a network, to other computer systems or peripheral devices.

In a networked deployment, the computer system 1000 operates in the capacity of one of the cluster nodes 110A-N, in the cluster 105. The computer system 1000 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 1024 (sequential or otherwise) to connect to a shared disk resource in a cluster environment. While a single computer system 1000 is illustrated, the term "system" includes any collection of systems or sub-systems that individually or jointly execute a set, or multiple sets, of instructions to perform one or more computer functions.

As illustrated in FIG. 10, the computer system 1000 includes a processor 1002, such as a central processing unit (CPU), a graphics processing unit (GPU), or both. The processor 1002 may be a component in a variety of systems. For example, the processor 1002 may be part of a standard personal computer or a workstation. The processor 1002 may also be one or more general processors, digital signal processors, application specific integrated circuits, field programmable gate arrays, servers, networks, digital circuits, analog circuits, combinations thereof, or other now known or later developed devices for analyzing and processing data.

The computer system 1000 includes a memory 1004 that can communicate via a bus 1008. The memory 1004 can be a main memory, a static memory, or a dynamic memory. The memory 1004 can be any type of computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 1004 includes a cache or random access memory for the processor 1002. Alternatively, the memory 1004 can be separate from the processor 1002, such as a cache memory of a processor, the system memory, or other memory. The memory 1004 could also be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 1004 stores instructions 1024 executable by the processor 1002. The functions, acts or tasks illustrated in the figures or described herein may be performed by the programmed processor 1002 executing the instructions 1024 stored in the memory 1004. The functions, acts or tasks can be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 1000 further includes a display 1014, such as a liquid crystal display (LCD), an organic light emitting diode (OLED), a flat panel display, a solid state display, a cathode ray tube (CRT), a projector, a printer or other now known or later developed display device for outputting determined information. The display 1014 acts as an interface for the user to see the functioning of the processor 1002, or specifically as an interface with the software stored in the memory 1004 or in the drive unit 1006.

Additionally, the computer system 1000 includes an input device 1012 configured to allow a user to interact with any of the components of system 100. The input device 1012 can be a number pad, a keyboard, or a cursor control device, such as a mouse, or a joystick, touch screen display, remote control or any other device operative to interact with the system 100.

The computer system 1000 may also include a disk or optical drive unit 1006. The disk drive unit 1006 includes a computer-readable medium 1022 in which one or more sets of instructions 1024, e.g. software, can be embedded. Further, the instructions 1024 can perform one or more of the methods or logic as described herein. The instructions 1024 may reside completely, or at least partially, within the memory 1004 and/or within the processor 1002 during execution by the computer system 1000. The memory 1004 and the processor 1002 can also include computer-readable media as discussed above.

The present disclosure contemplates a computer-readable medium 1022 that includes instructions 1024 or receives and executes instructions 1024 responsive to a propagated signal; so that a device connected to a network 202 may communicate voice, video, audio, images or any other data over the network 202. Further, the instructions 1024 may be transmitted or received over the network 202 via a communication interface 1018. The communication interface 1018 may be a part of the processor 1002 or may be a separate component. The communication interface 1018 may be created in software or may be a physical connection in hardware. The communication interface 1018 may be configured to connect with a network 202, external media, the display 1014, or any other components in system 3000, or combinations thereof. The connection with the network 202 may be a physical connection, such as a wired Ethernet connection or may be established wirelessly as discussed below. Likewise, the additional connections with other components of the system 100 may be physical connections or may be established wirelessly.

The network 202 may include wired networks, wireless networks, or combinations thereof. The wireless network may be a cellular telephone network, an 802.11, 802.16, 802.20, or WiMax network. Further, the network 202 may be a public network, such as the Internet, a private network, such as an intranet, or combinations thereof, and may utilize a variety of networking protocols now available or later developed including, but not limited to TCP/IP based networking protocols.

The computer-readable medium 1022 may be a single medium, or the computer-readable medium 1022 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 1022 may include a solid-state memory such as a memory card or other package that houses one or more non-volatile read-only memories. The computer-readable medium 1022 also may be a random access memory or other volatile re-writable memory. Additionally, the computer-readable medium 1022 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A method for adding a storage device to a cluster as a shared resource, comprising:
   performing the following steps in a processor:
      receiving a request to add a first storage device to a cluster as a shared resource where the first storage device shares a storage device identifier with a second storage device that is connected to the cluster as a shared resource;
      determining a partition format of the first storage device;
      writing a new storage device identifier on the first storage device in accordance with the partition format, irrespective of whether a storage device identifier was previously written; and
      connecting the first storage device to the cluster as a shared resource.

2. The method of claim 1 wherein the first storage device comprises a snapshot of a second storage device.

3. The method of claim 2 wherein the request to add the first storage device to the cluster is received from a first cluster node.

4. The method of claim 3 wherein the second storage device is connected to a second cluster node.

5. The method of claim 1 wherein the first storage device comprises a logical unit number.

6. The method of claim 1 wherein the partition format of the first storage device comprises a globally unique identifier partition table format.

7. The method of claim 6 wherein writing the new storage device identifier on the first storage device further comprises writing a storage device globally unique identifier in a globally unique partition table header on the first storage device.

8. The method of claim 6, wherein writing the new storage device identifier on the first storage device further comprises:
   retrieving a new storage device globally unique identifier and a new partition globally unique identifier;
   setting a storage device globally unique identifier of the first storage device to the new storage device globally unique identifier; and
   setting a partition globally unique identifier of the first storage device to the new partition globally unique identifier.

9. The method of claim 6 wherein writing the new storage device identifier on the first storage device further comprises:
   setting a plurality of primary globally unique identifiers in a globally unique identifier partition table storage device header and a partition entry array on the first storage device; and
   setting a plurality of backup globally unique identifiers in a backup globally unique identifier partition table storage device header and a backup partition entry array on the first storage device.

10. The method of claim 9, wherein setting a plurality of primary globally unique identifiers in a globally unique identifier partition table storage device header and a partition entry array on the first storage device further comprises:
   retrieving a new storage device globally unique identifier and a new partition globally unique identifier;
   reading the globally unique identifier partition table storage device header from the first storage device;
   setting a storage device globally unique identifier of the globally unique identifier partition table storage device header to the new storage device globally unique identifier;
   reading the partition entry array from the first storage device;
   setting a partition globally unique identifier of the partition entry array to the new partition globally unique identifier;
   calculating a new partition cyclic redundancy check value based on the partition entry array;
   setting a partition cyclic redundancy check value of the globally unique identifier partition table storage device header to the new partition cyclic redundancy check value;
   calculating a new header cyclic redundancy check value based on the globally unique identifier partition table storage device header; and
   setting a partition header cyclic redundancy check value of the globally unique identifier partition table storage device header to the new header cyclic redundancy check value.

11. The method of claim 9, wherein setting a plurality of backup globally unique identifiers in a backup globally unique identifier partition table storage device header and a backup partition entry array on the first storage device further comprises:
   reading a backup globally unique identifier partition table storage device header from the first storage device;
   setting a backup storage device globally unique identifier of the backup globally unique identifier partition table storage device header to the new storage device globally unique identifier;
   reading a backup partition entry array from the first storage device;
   setting a backup partition globally unique identifier of the backup partition entry array to the new partition globally unique identifier;
   calculating a new backup partition cyclic redundancy check value based on the backup partition entry array;
   setting a backup partition cyclic redundancy check value of the backup globally unique identifier partition table storage device header to the new backup partition cyclic redundancy check value;
   calculating a new backup header cyclic redundancy check value based on the backup globally unique identifier partition table storage device header; and
   setting a backup partition header cyclic redundancy check value of the backup globally unique identifier partition table storage device header to the new backup header cyclic redundancy check value.

12. A method for updating the globally unique identifiers associated with a globally unique identifier partition table storage device before connecting the globally unique identifier partition table storage device to a cluster node, comprising:
   retrieving a new storage device globally unique identifier and a new partition globally unique identifier from an operating system;
   setting a storage device globally unique identifier of a globally unique identifier partition table storage device header of a globally unique identifier partition table storage device to the new storage device globally unique identifier, irrespective of whether a storage device globally unique identifier was previously set;
   setting a partition globally unique identifier of a partition entry array of the globally unique identifier partition table storage device to the new partition globally unique identifier;
   setting a plurality of verification values associated with the globally unique identifier partition table storage device header;
   setting a plurality of backup values on the globally unique identifier partition table storage device; and
   connecting the globally unique identifier partition table storage device to a node of a cluster.

13. The method of claim 12, wherein setting a plurality of backup values on the globally unique identifier partition table storage device further comprises:
   setting a backup storage device globally unique identifier of a backup globally unique identifier partition table storage device header of the globally unique identifier partition table storage device to the new storage device globally unique identifier;
   setting a backup partition globally unique identifier of a backup partition entry array of the backup globally unique identifier partition table storage device to the new partition globally unique identifier; and
   setting a plurality of backup verification values associated with the backup globally unique identifier partition table storage device header.

14. The method of claim 13, wherein setting a plurality of backup verification values associated with the backup globally unique identifier partition table storage device header further comprises:
   calculating a new backup partition cyclic redundancy check value based on the backup partition entry array;
   setting a backup partition cyclic redundancy check value of the backup globally unique identifier partition table storage device header to the new backup partition cyclic redundancy check value;
   calculating a new backup header cyclic redundancy check value based on the backup globally unique identifier partition table storage device header; and
   setting a backup partition header cyclic redundancy check value of the backup globally unique identifier partition table storage device header to the new header cyclic redundancy check value.

15. The method of claim 12, wherein setting a plurality of verification values associated with the globally unique identifier partition table storage device header further comprises:
   calculating a new partition cyclic redundancy check value based on the partition entry array;
   setting a partition cyclic redundancy check value of the globally unique identifier partition table storage device header to the new partition cyclic redundancy check value;
   calculating a new header cyclic redundancy check value based on the globally unique identifier partition table header; and
   setting a partition header cyclic redundancy check value of the globally unique identifier partition table storage device header to the new header cyclic redundancy check value.

16. The method of claim 12, wherein the globally unique identifier partition table storage device comprises a snapshot of a second globally unique identifier partition table storage device connected to another node of the cluster as a shared storage device resource.

17. A system for adding a storage device to a cluster as a shared resource, the system comprising:
   a memory; and
   a processor in communication with the memory and operative to:
      receive a request to add a first storage device to a cluster as a shared resource where the first storage device shares a storage device identifier with a second storage device that is connected to the cluster as a shared resource;
      determine a partition format of the first storage device;
      write a new storage device identifier on the first storage device in accordance with the partition format, irrespective of whether a storage device identifier was previously written; and
      connect the first storage device to the cluster as a shared resource.

18. The system of claim 17 wherein the partition format of the first storage device comprises a globally unique identifier partition table format.

19. The system of claim 18 wherein the processor is further operative to set a storage device globally unique identifier in a globally unique partition table header on the first storage device.

20. The system of claim 17 wherein the first storage device comprises a snapshot of a second storage device.

21. The system of claim 17 wherein the request to add the first storage device to the cluster is received from a first cluster node.

22. The system of claim 21 wherein the second storage device is connected to a second cluster node.

23. A system for updating the globally unique identifiers associated with a globally unique identifier partition table storage device before connecting the globally unique identifier partition table storage device to a cluster node, the system comprising:
   a memory; and
   a processor in communication with the memory and operative to:
      retrieve a new storage device globally unique identifier and a new partition globally unique identifier from an operating system;
      set a storage device globally unique identifier of a globally unique identifier partition table storage device header of a globally unique identifier partition table storage device to the new storage device globally unique identifier, irrespective of whether a storage device globally unique identifier was previously set;
      set a partition globally unique identifier of a partition entry array of the globally unique identifier partition table storage device to the new partition globally unique identifier;
      set a plurality of verification values associated with the globally unique identifier partition table storage device header;

set a plurality of backup values on the globally unique identifier partition table storage device; and connect the globally unique identifier partition table storage device to a node of a cluster.

24. The system of claim 23, wherein the processor is further operative to:

set a backup storage device globally unique identifier of a backup globally unique identifier partition table storage device header of the globally unique identifier partition table storage device to the new storage device globally unique identifier;

set a backup partition globally unique identifier of a backup partition entry array of the backup globally unique identifier partition table storage device to the new partition globally unique identifier; and set a plurality of backup verification values associated with the backup globally unique identifier partition table storage device header.

25. The system of claim 23, wherein the processor is further operative to:

calculate a new partition cyclic redundancy check value based on the partition entry array;

set a partition cyclic redundancy check value of the globally unique identifier partition table storage device header to the new partition cyclic redundancy check value;

calculate a new header cyclic redundancy check value based on the globally unique identifier partition table storage device header; and set a partition header cyclic redundancy check value of the globally unique identifier partition table storage device header to the new header cyclic redundancy check value.

26. The system of claim 23, wherein the globally unique identifier partition table storage device comprises a snapshot of a second globally unique identifier partition table storage device connected to another node of the cluster as a shared storage device resource.

* * * * *